United States Patent [19]
Sarati et al.

[11] 3,808,537

[45] Apr. 30, 1974

[54] RADIOTELEPHONE SYSTEM WITH CENTRAL OFFICE HAVING INDIVIDUAL PROCESSORS ASSIGNABLE TO RESPECTIVE MOBILE UNITS ABOARD COMMUNICATING VEHICLES

[75] Inventors: Luigi Sarati; Vincenzo Intini, both of Milan, Italy

[73] Assignee: Societa Italiana Telecomunicazioni Siemens S.p.A., Milan, Italy

[22] Filed: Dec. 19, 1972

[21] Appl. No.: 316,582

Related U.S. Application Data

[62] Division of Ser. No. 112,562, Feb. 4, 1971, Pat. No. 3,729,595.

[30] Foreign Application Priority Data

Feb. 4, 1970 Italy....................20202/70
Feb. 9, 1970 Italy....................20380/70

[52] U.S. Cl........... 325/38 A, 179/41 A, 179/84 VF, 179/90 K, 325/55, 325/64, 340/171 PF

[51] Int. Cl........... H03k 13/00

[58] Field of Search......... 325/38 A, 55, 56, 59, 60, 325/64, 30; 340/171, 171 PF; 179/41 A; 178/DIG. 3

[56] References Cited

UNITED STATES PATENTS

| | | | |
|---|---|---|---|
| 3,347,981 | 10/1967 | Kagan et al. | 178/DIG. 3 |
| 3,601,702 | 8/1971 | Lender | 325/38 A |
| 3,754,237 | 8/1973 | De Laage de Meux | 325/38 A |
| 3,588,371 | 6/1971 | Dal Monte | 179/41 A |
| 3,691,464 | 9/1972 | Dayton et al. | 325/55 |
| 3,035,250 | 5/1962 | Durkee et al. | 340/171 PF |
| 3,740,550 | 6/1973 | Geiger | 340/171 PF |

*Primary Examiner*—Robert L. Griffin
*Assistant Examiner*—Jin F. Ng
*Attorney, Agent, or Firm*—Karl F. Ross; Herbert Dubno

[57] ABSTRACT

A central office, designed for short-wave radiocommunication with mobile units aboard several vehicles in its area, has a plurality of fixed processing units operating on different frequency channels to communicate with various vehicle-borne mobile units in the area. Each processing unit includes a programmer (PG) which measures the response periods of a mobile unit to calling and switching signals transmitted by the central office and terminates the connection in the case of excessive delays. Each mobile unit has a transceiver tunable to any of these channels under the control of a ring counter (CA) which, on being started by an alert signal from the central office (in response to an incoming call) or by actuation of a hook switch aboard the vehicle (to initiate an outgoing call), drives the transceiver through all or part of a scanning cycle until a free channel has been found or until the search is halted by a concurrently actuated delay counter (CR). In either case, the ring counter locks the transceiver to the channel last explored until the next call is initiated. Each channel comprises two carrier waves modulated by a selected pair of audio frequencies out of a total of six such frequencies ($f_1 - f_6$) available for the transmission of numerical information in either direction; a seventh frequency ($f_7$) is used in combination with two of the others ($f_5, f_6$) to pass switching or supervisory signals from the central office to the vehicle. If the call number of the mobile unit and/or of a station called from the vehicle includes two or more like digits in immediate succession, a repetition code (R) is substituted for the second, fourth etc., iterative digit to facilitate recognition of transition from one digit to the next.

1 Claim, 10 Drawing Figures

RADIOTELEPHONE SYSTEM WITH CENTRAL OFFICE HAVING INDIVIDUAL PROCESSORS ASSIGNABLE TO RESPECTIVE MOBILE UNITS ABOARD COMMUNICATING VEHICLES

This is a division of application Ser. No. 112,562, filed Feb. 4, 1971 U.S. Pat. No. 3,729,595. Our present invention relates to a radiotelephone system of the type wherein a central office with incoming subscriber lines is adapted to establish talking connections between any of these lines and a mobile unit aboard any of several vehicles within range of a transmitting and receiving station associated with the central office.

Such a system has been described in commonly owned allowed application Ser. No. 796,054 filed Feb. 3, 1969 by Giorgio Del Monte and Francesco Motolese, now U.S. Pat. No. 3,588,371 the disclosure of that application being hereby incorporated by reference into the present application.

Aside from need for maintaining radio contact between a moving vehicle, such as an automobile, and a central office accessible to the vehicle by short-wave transmission, consideration in such a system must also be given to the fact that the user of the mobile station (frequently the driver of the vehicle) may not be able to divert his attention from the terrain for a sufficient period to select the number of a called station (either a fixed subscriber or another vehicle believed to be in the area) by the usual dialing process. Another problem arises from the fact that the radio signal exchanged between the mobile unit and the fixed terminal equipment ocasionally tends to fade for short periods so that means must be provided to distinguish between such fading and an intentional termination of the connection. This phenomenon of fading also impedes the transmission of digital information if a numerical message to be transmitted, such as the identification code of the mobile unit or of a called party, includes two or more identical consecutive digits.

It is, therefore, the general object of our present invention to provide an improved radiotelephone system of the aforestated character having means for overcoming these difficulties.

More specifically, our invention aims at providing means for permitting a user aboard a moving vehicle to preselect at an opportune moment the call number of a party he wishes to contact and to establish communication with such party at a subsequent time by a simple operation, such as the depressing of a pushbutton, which does not materially impair his ability to guide the vehicle through traffic.

Another more specific object is to provide means in such a system for discriminating between consecutive identical digits without the need for separating them by a pause of predetermined duration, thereby accelerating the transmission of numerical messages with or without repetitive digits over a radio-frequency channel.

Our invention also aims at providing means for reducing the power drain of a vehicle-borne unit in its quiescent state by partly de-energizing its components, especially its logical circuitry, during periods of nonuse.

According to an advantageous feature of our invention, the initiation of a call (by either the vehicle-borne station or some other party) actuates a scanning circuit which consecutively tunes the associated transceiver to the several radio channels provided for telecommunication between the mobile unit and the nearest central office; a decoder in the mobile unit, responding to an availability signal on a free channel, arrests the scan on that channel by discontinuing the stepping of a ring counter controlling the scanner. Between calls, the ring counter remains in the position last occupied so as to start the next exploration in a random manner with no preference given to any particular channel.

Pursuant to another feature of our invention, each vehicle-borne mobile unit included in the system comprises an encoder which converts a stored multidigit number, digit by digit, into a succession of characteristic signal combinations, ten of these combinations representing the digits 0 through 9 whereas an eleventh combination denotes a repetition of an immediately preceding digit. If the same digit occurs more than twice in immediate succession, every odd-numbered occurrence is represented by its own characteristic signal combination whereas every even-numbered occurrence gives rise to the repetition code (hereinafter designated R). Thus, any multidigit number can be encoded in a series of signal combinations each differing from the immediately preceding and/or following one.

For the transmission of the identification code or call number of the mobile unit, the encoder can be connected to a register in the form of a fixed coding matrix which stores the code R at the location of any second, fourth, etc., iterative digit in the call number of that unit. For transmission of the number of a called party, the encoder may be connected to another register with orthogonally intersecting arrays of input and output conductors forming junctions at selected intersections as determined by the number to be called, two or more junctions on the same output conductor short-circuiting the corresponding input conductors which in turn are connected in consecutive pairs to respective coincidence (e.g., NAND) gates responding to such a short circuit due to the presence of iterative digits. This response triggers the generation of the repetition code R and blocks the generation of the digital code normally associated with that particular output conductor; a flip-flop responsive to the output of these coincidence gates, however, prevents the iterative generation of the code R and restores normal coding upon the third, fifth, etc. occurrence of a repeated digit.

According to another aspect of our invention, the central office communicating with one or more mobile units is provided with a timing circuit for discriminating between a short-term interruption of radio communication (fading) and a long-term interruption (absence of response to termination by either party). Owing to the elimination of any time intervals between the digital codes transmitted, this timing circuit can go into action at any stage in the establishment and maintenance of communication between the central office and an associated mobile unit.

The above and other features of our invention will be described in detailed hereinafter with reference to the accompanying drawing in which.

Figure 1:
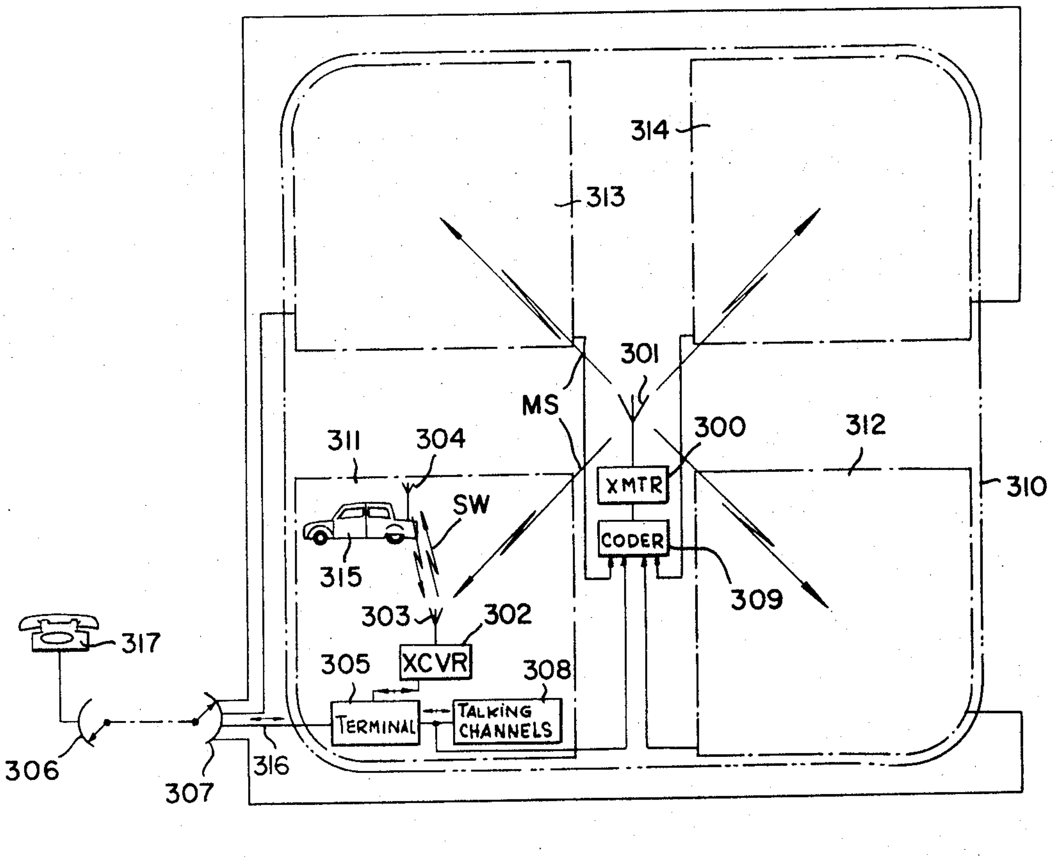
FIG. 1 is a diagrammatic plan view of several radiotelephone areas forming part of a region served by a common calling transmitter.
Figure 2:
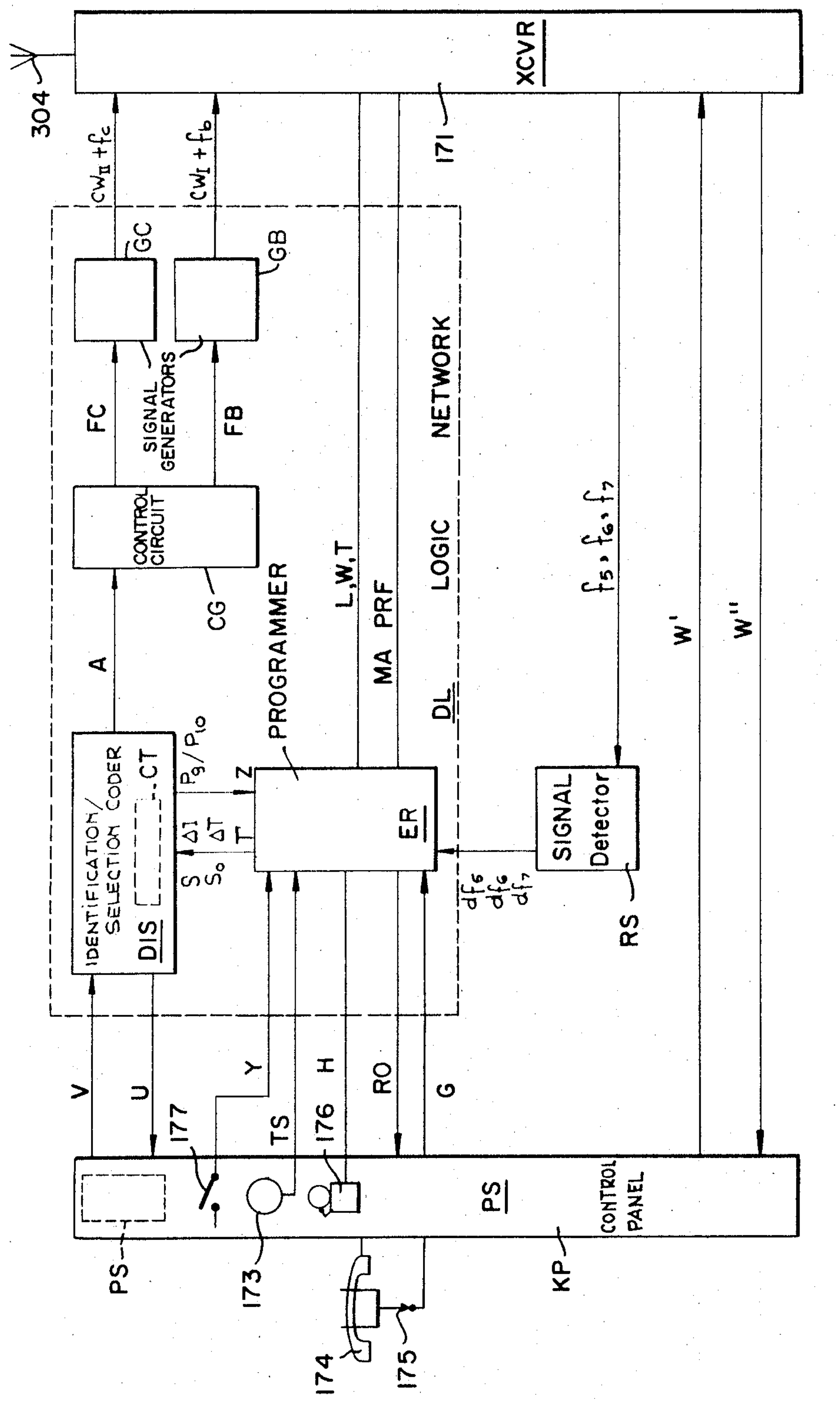
FIG. 2 is a block diagram of the principal components of a mobile unit aboard a vehicle included in the system of FIG. 1.
Figure 3A:
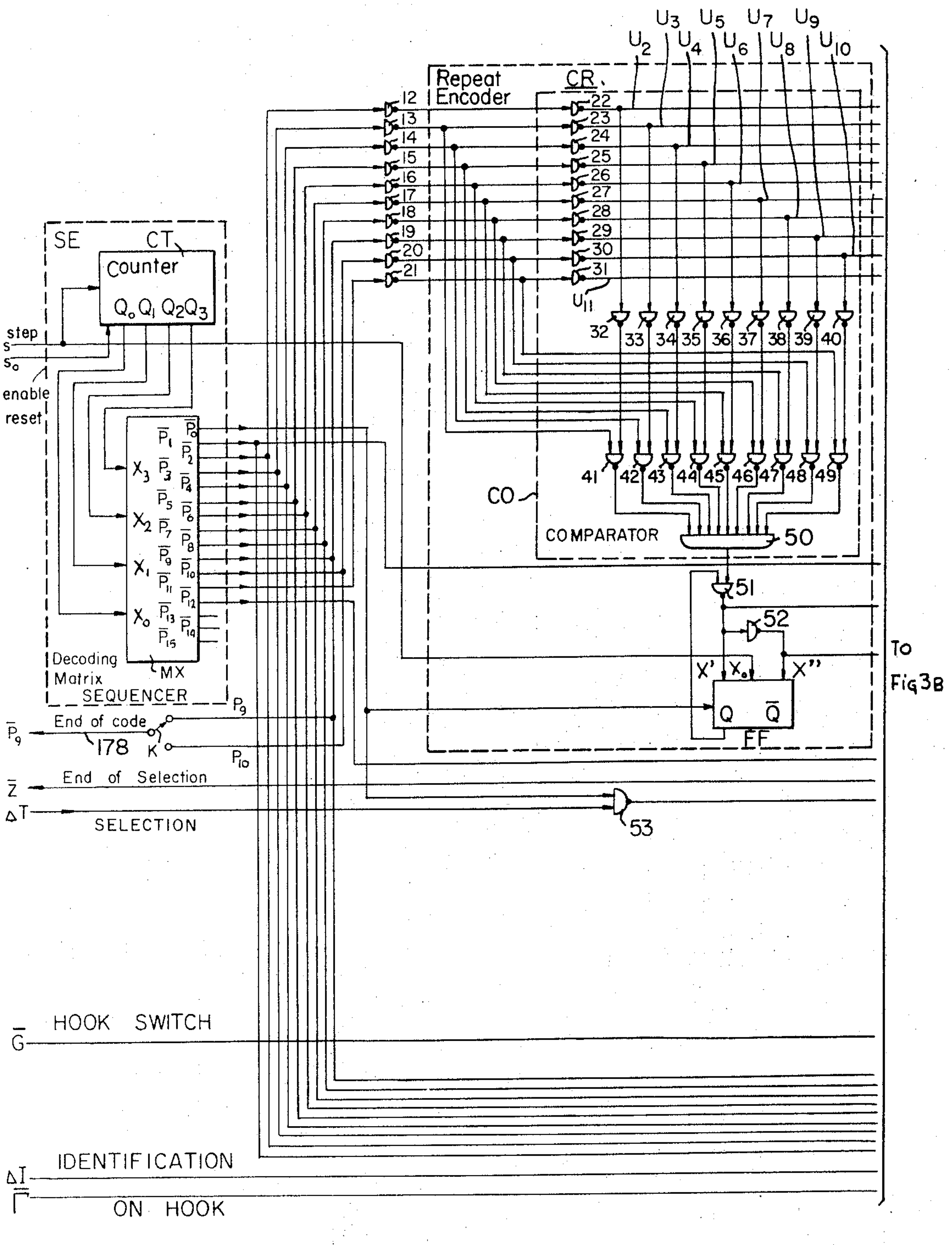
Figure 3B:
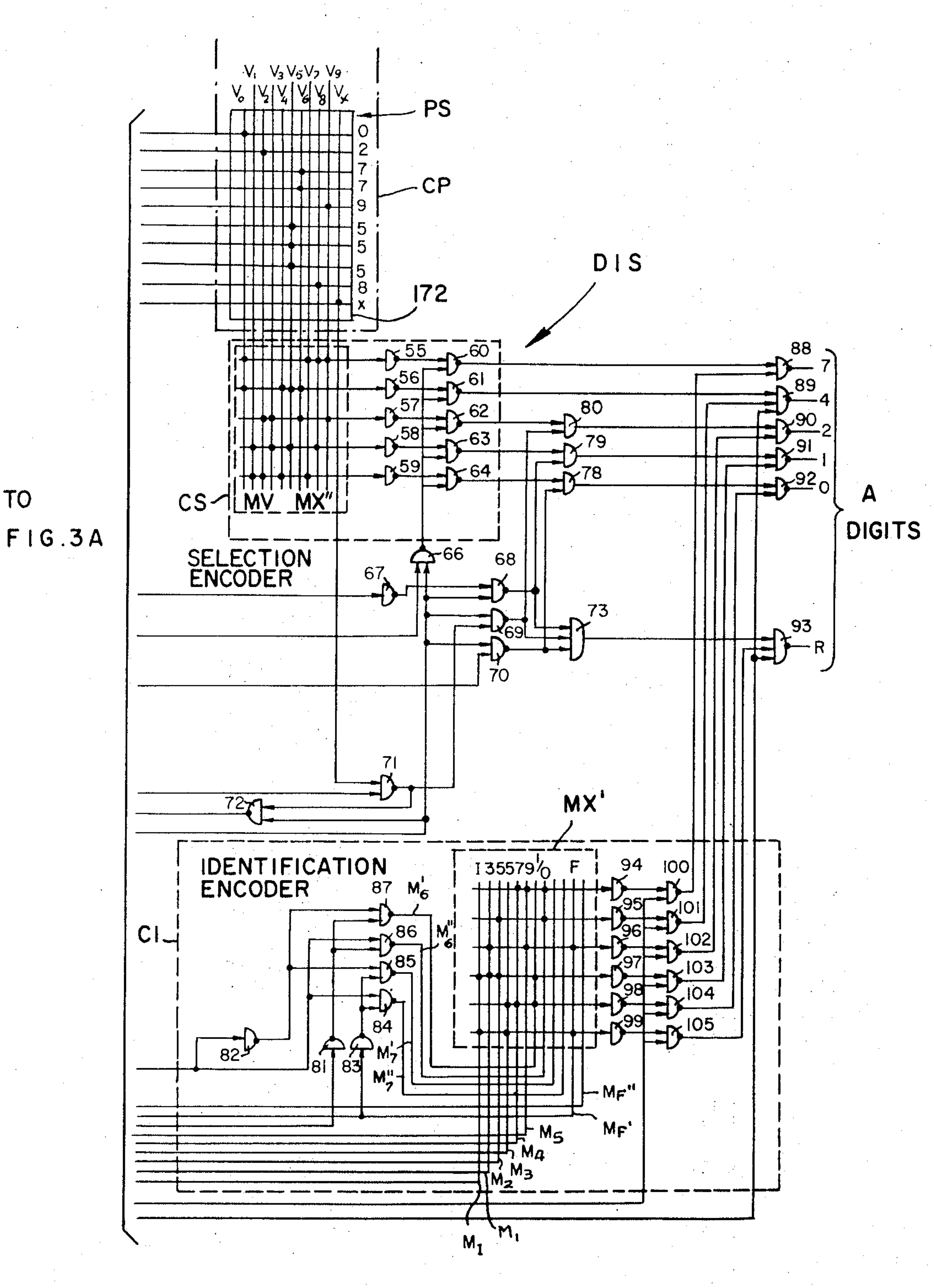
Figure 4A:
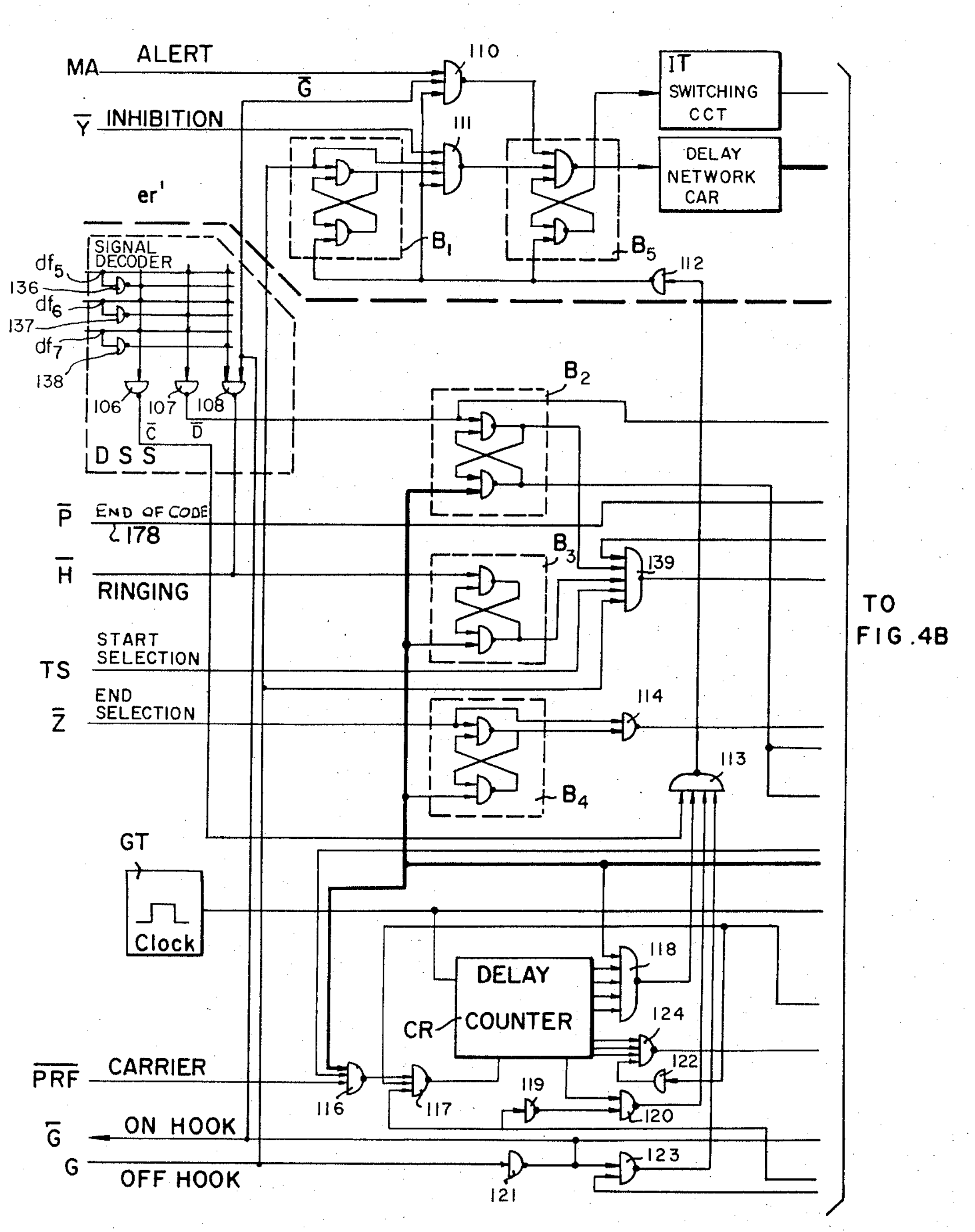
Figure 4B:
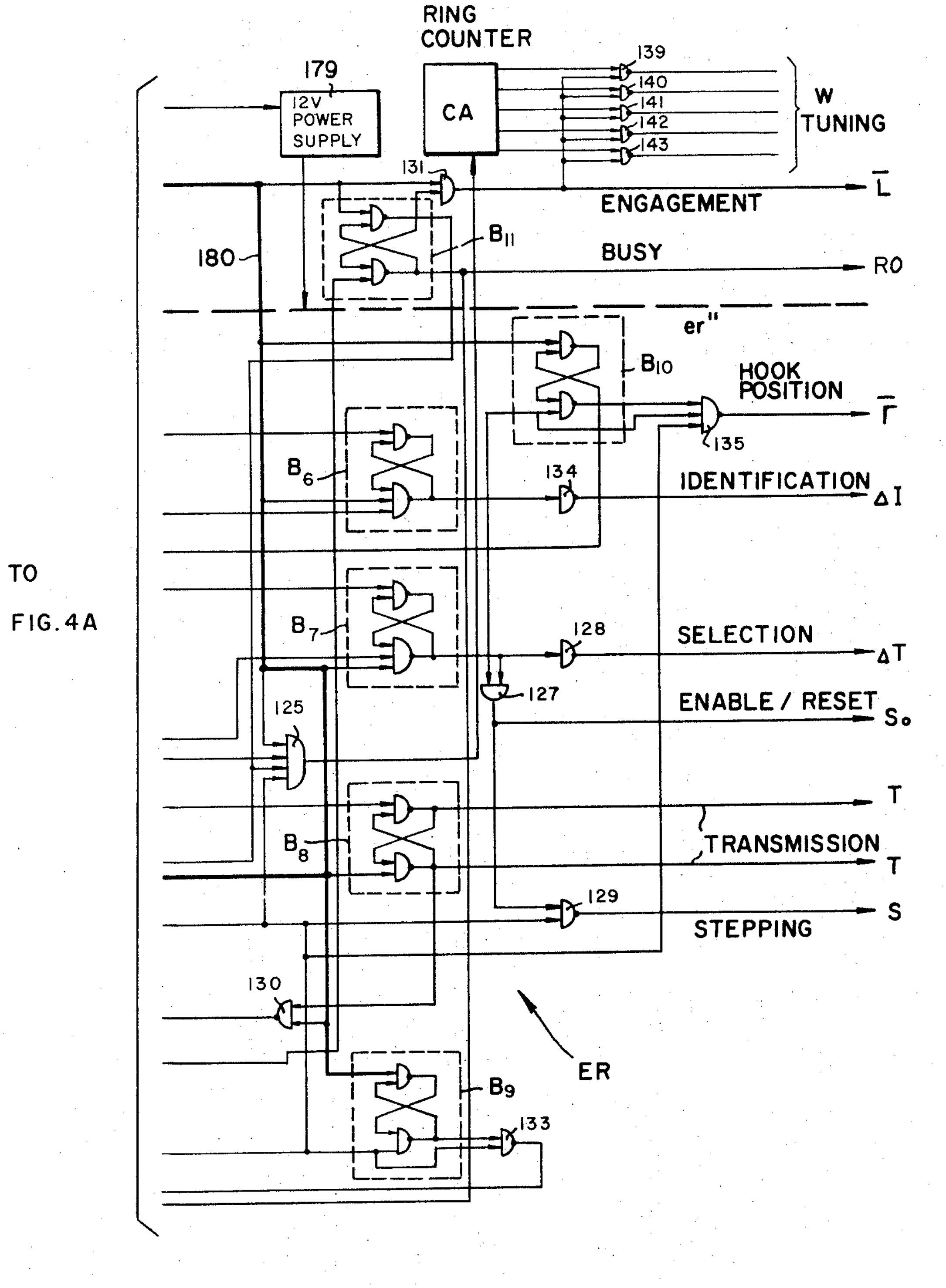
Figure 5:
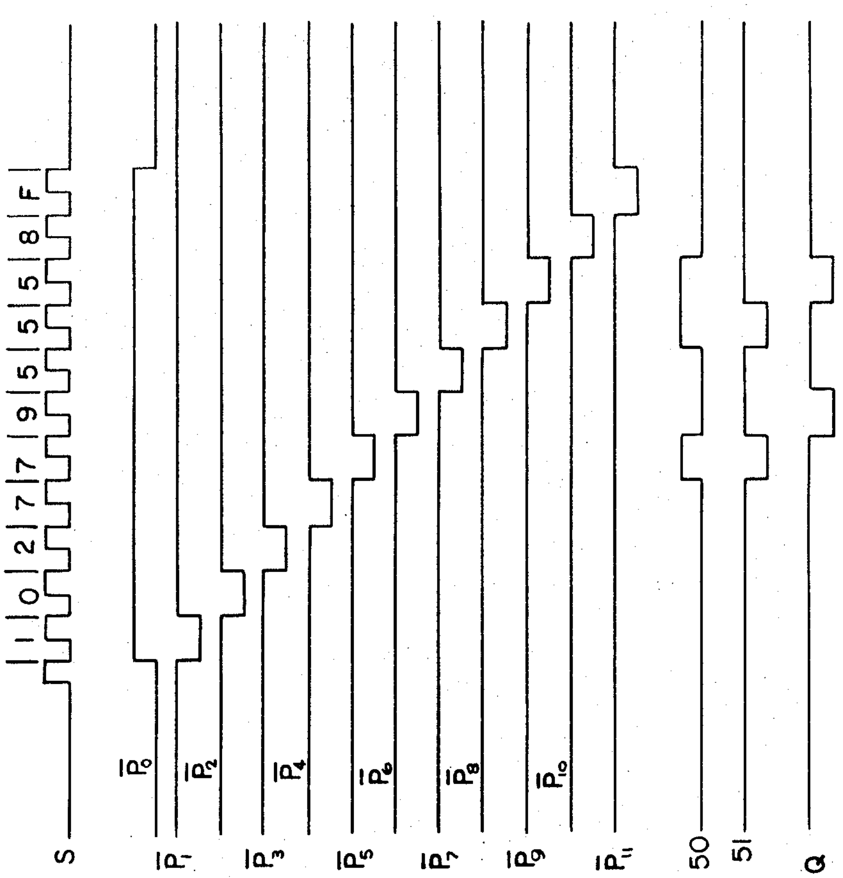
Figure 6:
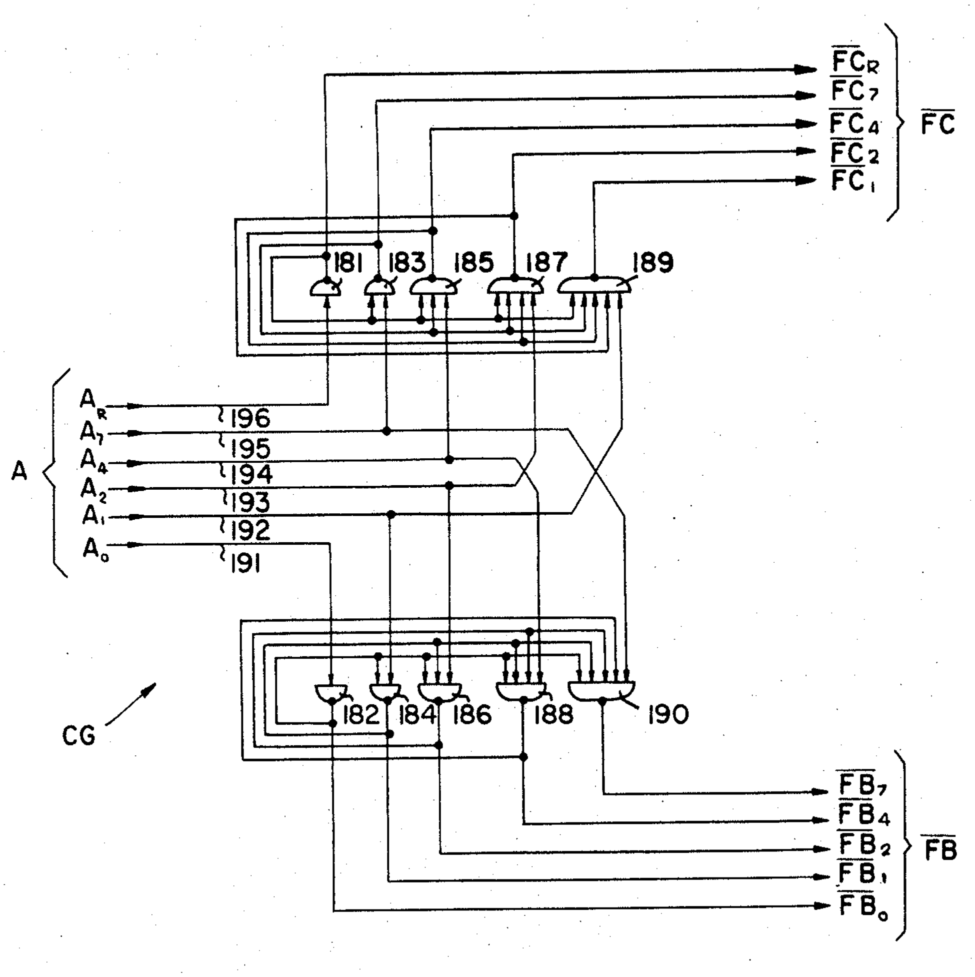
Figure 7:
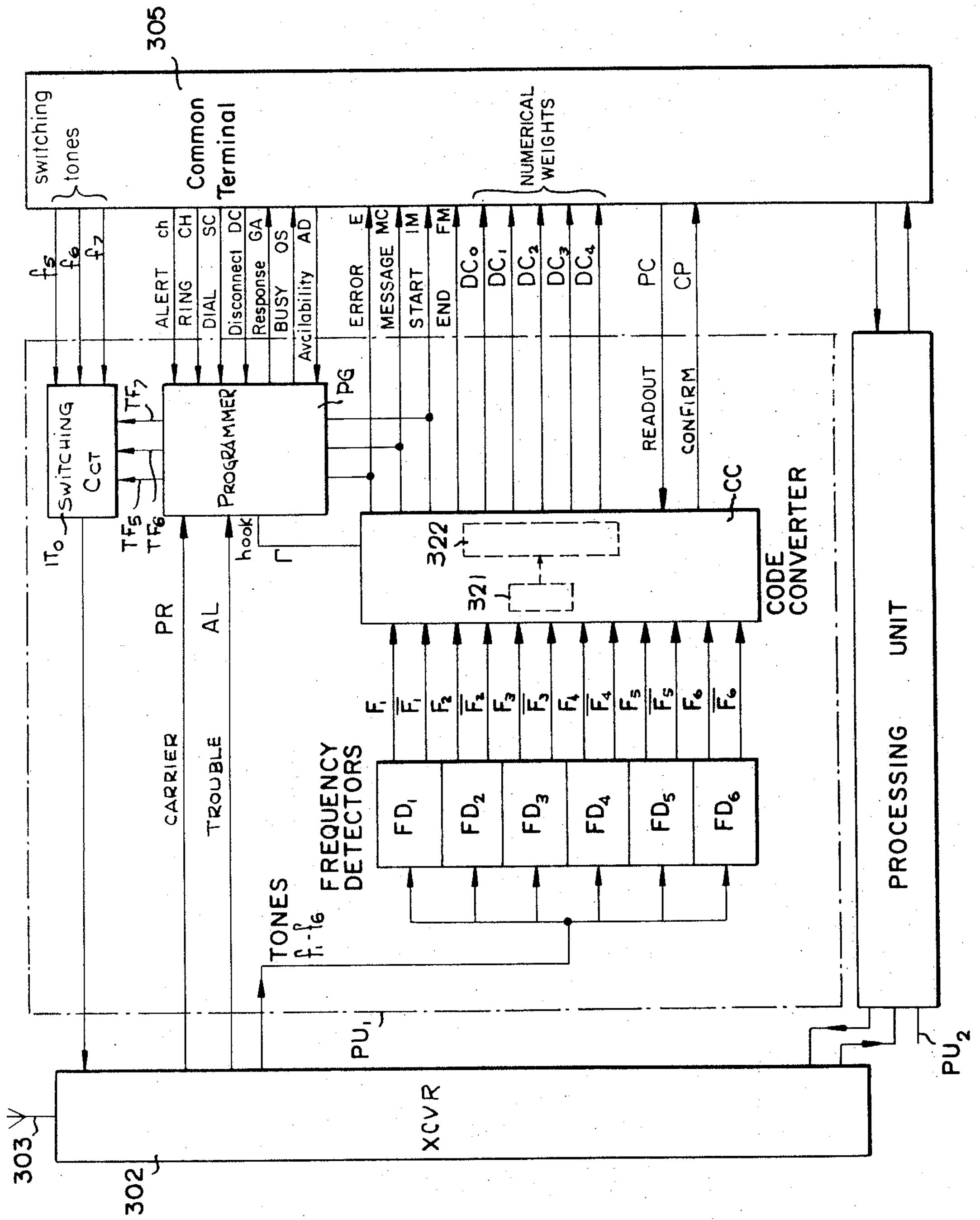
Figure 8:
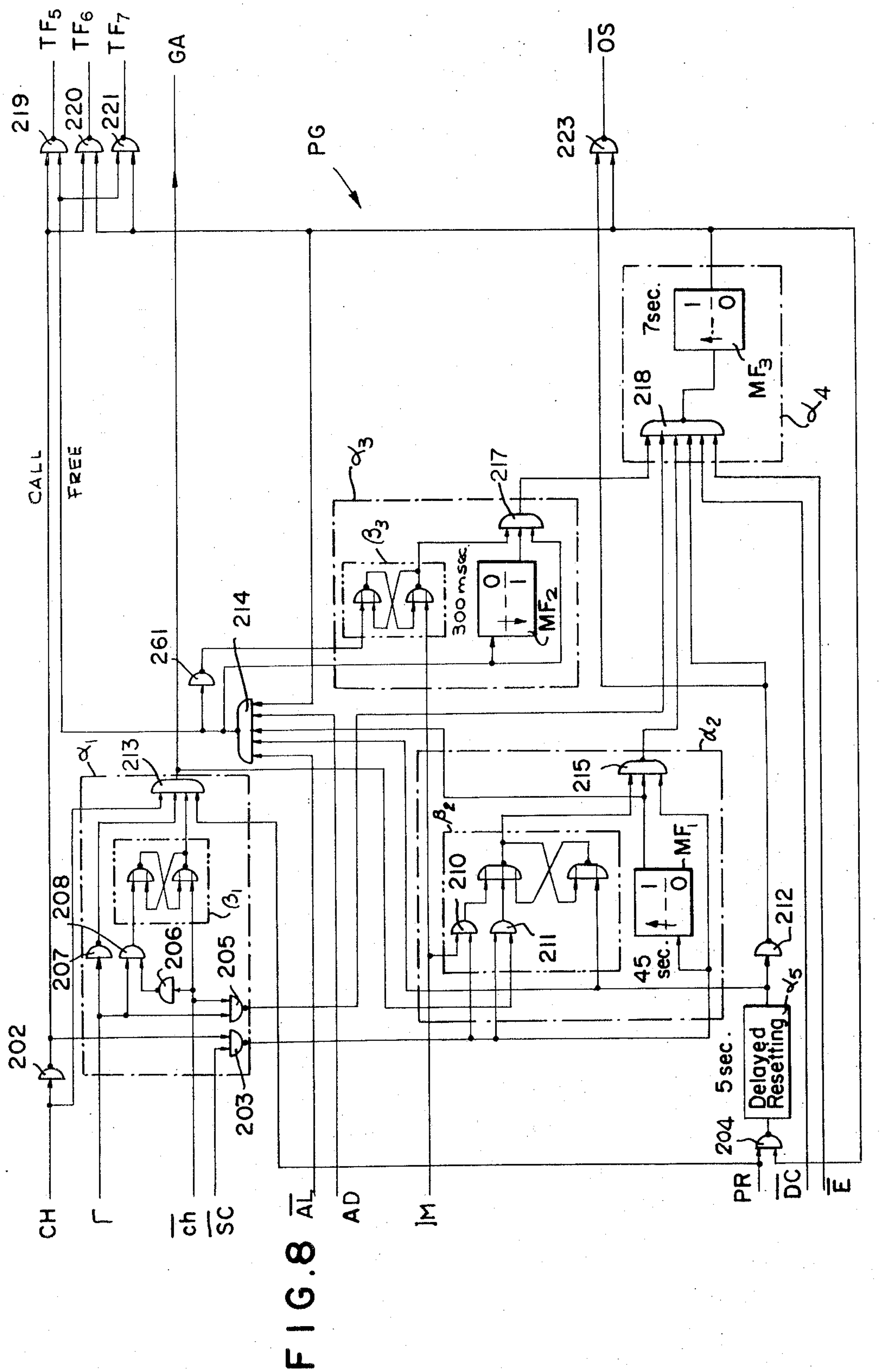

FIGS. 3A and 3B, when placed side by side, constitute a more detailed circuit diagram of an identification and selection coder forming part of the unit of FIG. 2;

FIGS. 4A and 4B, when placed side by side, constitute a similar circuit diagram for a programmer associated with the coder of FIGS. 3A and 3B;

FIG. 5 is a set of graphs serving to explain the operation of the coder of FIGS. 3A and 3B;

FIG. 6 shows details of a control circuit responding to the output of the coder of FIGS. 3A and 3B;

FIG. 7 is a block diagram similar to FIG. 2, illustrating various components of a central office included in the system of FIG. 1; and FIG. 8 shows details of a programmer forming part of the terminal station of FIG. 7.

FIG. 1 is identical (except for the reference numerals employed) with the corresponding figure of commonly owned application Ser. No. 795,054 U.S. Pat. No. 3,588,371 referred to above. This figure shows a zone 310 subdivided into several radiotelephone areas 311, 312, 313, 314; in practice, these areas will be somewhat overlapping and more or less circular although, for the sake of clarity, they have not been so illustrated.

A transmitter 300, covering the entire zone 310, has an antenna 301 disposed substantially at the center of that zone to radiate a monitoring signal to any vehicle 315 within the zone whenever a call or such vehicle arrives at a central office located in one or more of its areas 311 – 314. For the sake of simplicity, we have illustrated in FIG. 1 only the central office of area 311 (in which the vehicle 315 also happens to be located), it being understood that similar equipment exists at each of the other three areas and that, of course, the number of such areas may vary.

The central office of area 311 comprises a transmitrecieve station diagrammatically represented by a transceiver 302 having an antenna 303. A similar antenna 304 aboard vehicle 315 forms the other terminal of a radio link interconnecting station 302 and the mobile unit carried by the vehicle, this radio link generally operating on short waves SW to accommodate the necessary number of voice-frequency bands which accounts for the restricted effective area of the radio link as compared with that of antenna 301 whose monitoring signal may be broadcast at a considerably lower carrier frequency.

The transceiver 302 of the central office is connected to associated terminal equipment 305 including the final selector stage responsive to calls incoming over associated subscriber lines; one such line has been illustrated at 316 and leads to a subscriber 317 by way of the usual line finder 306 and another selector stage 307 adapted to extend the call to the central office of any of the four areas shown in FIG. 1. The terminal equipment 305, in turn, works into a set of talking channels 308. An output of network 305 leads to a coder 309 associated with the central transmitting station 300, this coder translating the final digit or digits of the call signal (with the exception of a supplemental digit described hereinafter) into a pulse code modulating the carrier wave radiated by antenna 301.

Briefly, the operation of the system of FIG. 1, in response to a call from a subscriber 317 (or possibly from a mobile unit establishing a connection with terminal network 305), is as follows:

The incoming call, relayed to transmitter 300, triggers the latter into the emission of a monitoring signal MS containing the identification code of a mobile unit aboard a vehicle 315 believed to be within the operating area 311 of that central office. The receiving equipment aboard vehicle 315 responds to that monitoring signal, upon recognizing this code as its own, by retransmitting the same code to station 302 via the radio link represented by antennas 304, 303. Station 302 feeds the retransmitted code to network 308 which, in a manner described in greater detail hereinafter, temporarily stores that code in one of several memories of a register provided for this purpose. Meanwhile, a memory in another register of network 308 has already stored the code received directly from network 305 upon the arrival of the call via line 316. Now, the two stored codes are automatically compared and, upon the establishment of their identity, a talking circuit is completed from network 305 via station 302 and antennas 303, 304, with transmission of a ringing or other alarm signal to the mobile unit, so that the user aboard the vehicle 315 can instantly enter into a conversation with the calling subscriber upon lifting his receiver.

If the vehicle 315 had been out of range of antenna 303 (as by passing through one of the other areas 312 – 314) when picking up the signal from antenna 301, the cell would not have gone through and the identification code temporarily stored in network 308 would have been canceled as soon as the calling subscriber 317 had released the equipment 305 by hanging up his receiver.

If a user aboard vehicle 315 intends to initiate a call to, say, the subscriber 317, he picks up the receiver which results in the automatic transmission of the identification code of his mobile unit to station 302, as in the case previously discussed, whereupon this code is again stored in one of the mobile-unit memories of network 308. Again, a search is automatically started to ascertain whether the code of this mobile unit is already stored in one of the outgoing-call memories of network 308 to await the establishment of a talking connection to vehicle 315; if so, the outgoing call takes precedence over the incoming call from the vehicle and is put through in the manner described above. If, however, the code of the calling vehicle is not already stored in the register containing the outgoing-call memories of network 308, the comparison of the contacts of the two registers yields a negative result and causes the generation of a switching signal transmitted via antennas 303, 304 to the vehicle where, in view of the fact that the receiver of the mobile unit is already off the hook, circuits are completed for informing the user (e.g., by way of the customary dial tone) that he may proceed to select the number of the station he wishes to reach.

In FIG. 2 we have shown major components of the mobile transmitting and receiving unit aboard the vehicle 315 of FIG. 1. Antenna 304 forms part of a transceiver which, like its counterpart in the prior application referred to, has been designated 171. The transceiver is tunable to transmit and receive, in a manner more fully described hereinafter, on any one of several radio channels each constituted by a pair of carrier waves $cw_I$ and $cw_{II}$; the lower carrier wave $cw_I$ can be modulated with any one of six audio frequencies or tones $f_1 - f_6$ whereas the higher carrier wave $cw_{II}$ can be modulated by the five tones $f_2 - f_6$ as well as a further tone $f_7$. Audio frequency $f_7$ is used only for transmission from the central office (antenna 303) to the mobile unit (antenna 304, FIG. 1); the six remaining frequencies $f_1 - f_6$ can be paired in 15 different combinations for the transmission of the digits 0 through 9, the repetition code R and several switching or supervisory signals later described.

The mobile unit further comprises a signal detector RS receiving the modulating frequencies $f_5, f_6, f_7$ from transceiver 171 and delivering corresponding voltages $df_5$, $df_6$, $df_7$ to a programmer ER forming part of a logic network DL. This logic network further includes an identification/selection coder DIS, a pair of signal generators GB and GC (i.e., oscillators and mixers) for the modulation of outgoing carrier waves $cw_I$ and $cw_{II}$ with respective audio frequencies $f_b$ and $f_c$ taken from the aforementioned tone groups $f_1 - f_5$ and $f_2 - f_6$, and a control circuit CG which responds to output signals collectively designated A to select these modulating frequencies by means of signal voltages FB and FC as more fully described hereinafter with reference to FIG. 6. Coder DIS exchanges signals U and V with a preselector PS in a control panel KP; the preselector may comprise a wheel or other storage device indexable in several positions to connect leads U and V (each representing a multiplicity of such leads) with respective arrays of orthogonally intersecting input and output conductors on an address plate or similar printed-circuit carrier 172 (FIG. 3B) identifying a party to be called, as more fully described hereinafter. A pushbutton 173 on panel KP allows the user of the mobile unit, such as the driver of the vehicle 315 shown in FIG. 1, to initiate the automatic transmission of the address code of a selected party by supplying a start signal TS to programmer ER. A micro-telephone 174 on panel KP controls a hook switch 175 which reports its position to the programmer in the form of a signal G. Programmer ER, in turn, may emit a ringing signal H to operate a bell or buzzer 176, as well as a busy signal RO which may be retransmitted to the receiver of handset 174. Finally, a lockout switch 177 (operated, for example, by a key) may be used to disable the transmitting and receiving unit aboard the vehicle by feeding an inhibition signal Y to the programmer.

Coder DIS includes a counter CT whose operation is controlled by the programmer ER via stepping pulses 8 and an enabling signal $S_o$, the negation of the latter signal causing the counter to be reset. Further signals ΔI and ΔT command the emission of either the identification code of the mobile unit or the address code of a selected party. A signal Γ, also transmitted by the programmer ER to the coder DIS, informs the latter of the position of hook switch 175. The programmer receives from the coder an end-of-code signal $P_9/P_{10}$ (occurring either in the ninth or in the tenth cycle of the counter, depending on the number of digits in the identification code) as well as an end-of-selection signal Z after the address stored in preselector PS has been read out.

Signals sent directly from the programmer ER to the transceiver 171 include an engagement signal L, scanning signals W effect in the presence of signal L to change the tuning of the transceiver, and a signal T enabling carrier transmission to proceed. The transceiver, in its turn, feeds to the programmer ER a call signal MA in response to monitoring signal MS (FIG. 1) and a signal PRF indicative of the presence of a high-frequency carrier on the channel to which the transceiver has been tuned.

Finally, wires $w'$, $w''$ extend between transceiver 171 and control panel KP for the passage of voice currents to and from microtelephone 174.

In the detailed description given hereinafter with reference to FIGS. 3A, 3B and 4A, 4B, some of the signals discussed above are represented by their negative conventionally characterized by a bar; it will be understood that the presence of such a bar indicates energization of the corresponding conductor in the normal (quiescent) state, the absence of a bar signifying that the conductor is normally grounded.

The components of coder DIS, shown in FIGS. 3A and 3B, include a sequencer SE which incorporates the counter CT along with a matrix MX for the conversion of the binary readings of the counter, transmitted from its four outputs $Q_o$, $Q_1$, $Q_2$, $Q_3$ to corresponding inputs $X_o$, $X_1$, $X_2$, $X_3$ of the matrix, into respective signals on thirteen output leads $\bar{P}_o \ldots \bar{P}_{12}$ of the matrix; the remaining three output leads $\bar{P}_{13}$, $\bar{P}_{14}$, $\bar{P}_{15}$ are not used in this illustrative embodiment. Counter CT is normally reset, in the absence of enabling signal $S_o$, with resulting de-energization of output $\bar{P}_o$, all the other outputs of decoding matrix MX being energized. A lead 178, via a via manual switch K to either of the two outputs $\bar{P}_9$, $\bar{P}_{10}$ in accordance with the code employed, is also energized under these conditions; in the specific switch position illustrated, applying to a 6-digit identification code, lead 178 normally carries the signal $\bar{P}_9$.

Another component of circuit DIS is a repeat encoder CR with ten inputs connected to the outputs $\bar{P}_2 - \bar{P}_{11}$ of sequencer SE by way of respective inverters 12 – 21. Encoder CR includes a comparator CO with nine NAND gates 41 – 49 each having one input directly connected to the output of a respective inverter 13 – 21 and having its other input connected to the output of the immediately preceding inverter (12 – 20, respectively) via a respective pair of cascaded inverters 22 – 30 and 32 – 40. Inverters 22 – 30, together with a further inverter 31 in series with inverter 21, have output leads $U_2 - U_{11}$ (collectively designated U in FIG. 2) terminating at respective horizontal input conductors of an address card 172 operatively positioned in preselector PS of control panel KP; this card also has an array of eleven vertical output conductors which have been designated $V_o - V_9$ and $V_x$ (collectively indicated at V in FIG. 2) and lead to a matrix MX'' in a selection encoder CS. A similar matrix MX' in an identification encoder CI has vertical input leads $M_I$, $M_1 - M_5$, $M_6'$, $M_6''$, $M_7'$, $M_7''$, $M_F'$ and $M_F''$ energizable from sequencer outputs $\bar{P}_1 - \bar{P}_9$ either directly or via inverters 81, 83 and NAND gates 84 – 87, gates 84 and 86 also receiving the negation of hook-switch signal $\bar{G}$ whereas gates 85 and 87 receive the signal G itself through an inverter 82.

The selection encoder CS includes five NAND gates 60 – 64 each having one input connected through an associated inverter 55 – 59 to a respective output lead of matrix MX''. The other inputs of NAND gates 60 – 64 are tied to the output of an AND gate 66 having one input connected, in parallel with corresponding inputs of three NAND gates 68, 69 and 70, to the output of another AND gate 53 receiving the signal $\bar{P}_o$ from the first counter output and the selection command ΔT. NAND gates 68 – 70 energize respective inputs of an AND gate 73 and also work individually into other AND gates 79, 80 and 78, respectively, whose second inputs are respectively fed by NAND gates 63, 62 and 64.

Another set of AND gates 100 – 105 form part of identification encoder CI and are jointly energizable by the identification command ΔI, their second inputs being connected to respective outputs of matrix MX′ by way of individual inverters 94 – 99.

The final stage of coder DIS comprises six NAND gates 88 – 93 giving rise to digital output voltages A of different numerical weights, i.e., "0" (gate 92), "1" (gate 91), "2" (gate 90). "4" (gate 89), "7" (gate 88) and "R" (gate 93). The on-hook signal $\overline{\Gamma}$ is applied to additional (third) inputs of NAND gates 89 and 93; each of gates 88 – 92 has one input connected to the output of a respective NAND gate 60 – 64 of encoder CS (via AND gates 80, 79 and 78 in the case of gates 90 – 92) and has another input connected to the output of a respective NAND gate 100 – 104 of encoder CI. The two remaining inputs of NAND gate 93 are connected to the outputs of gates 73 and 105.

Comparator CO includes a NAND gate 50 with nine inputs respectively connected to the outputs of NAND gates 41 – 49. NAND gate 50 works via a NAND gate 51 into a normally energized inputs X′ of a flip-flop FF whose corresponding output Q is fed back to the other input of NAND gate 51. The alternate flip-flop input X″ is fed from gate 51 through an inverter 52, the corresponding output (not used) being designated $\overline{Q}$. Flip-flop FF also has a stepping input $X_o$, connected to receive the pulses S in parallel with the counter CT, and an enabling input tied to the output $\overline{P}_o$ of matrix MX. The output of NAND gate 51 is further supplied to the other input of AND gate 66 and, via inverter 52, to that of NAND gate 70. NAND gate 68 has its second input connected to sequencer output $\overline{P}_1$ through an inverter 67 whereas the second input of NAND gate 69 is tied to the output of a NAND gate 71 in parallel with an input of another NAND gate 72 also receiving the output of AND gate 53. NAND gate 72 normally conducts to generate the signal $\overline{Z}$ (negation of end of selection); the inputs of NAND gate 71 are the final output $\overline{P}_{12}$ of matrix MX and the corresponding output $V_x$ of selector plate 172 and matrix MX″.

The six numerical weights represented by the output voltages (collectively designated A) of NAND gates 88 – 93 can be combined in 14 different pairs to represent the 10 digits 0 – 9 of the decimal system, the repetition code R, a start-of-message signal IM, an end-of-message signal FM and the hook signal Γ, as shown in the following Table which also lists the corresponding tones $f_1 - f_6$ generated in response to these voltages. It will be noted that the digital values 1 – 9 equal the natural sums of their constituent weights (the naught being represented by the sum of weights "4" and "7") and that the repetition code R is constituted by the combination of weights "0" (frequency $f_1$) and "R" (frequency $f_6$). The Table also shows that the weight "R" intervenes in the generation of signals IM, FM and Γ, and that the combination of frequencies $f_5$ and $f_6$ (when received at the mobile unit as more fully described hereinafter with reference to FIG. 4A) gives rise to the ringing signal H; the seventh frequency $f_7$, which has to numerical weight, may be received together with frequency $f_5$ or $f_6$ to generate an availability signal D or a disconnect signal C.

TABLE.—AUDIO FREQUENCIES AND NUMERICAL WEIGHTS

| $f_1$ "0" | $f_2$ "1" | $f_3$ "2" | $f_4$ "4" | $f_5$ "7" | $f_6$ "R" | $f_7$ | |
|---|---|---|---|---|---|---|---|
| | | | + | + | | | Digit 0. |
| + | + | | | | | | Digit 1. |
| + | | + | | | | | Digit 2. |
| | + | + | | | | | Digit 3. |
| + | | | + | | | | Digit 4. |
| | + | | + | | | | Digit 5. |
| | | + | + | | | | Digit 6. |
| + | | | | + | | | Digit 7. |
| | + | | | + | | | Digit 8. |
| | | + | | + | | | Digit 9. |
| + | | | | | + | | Digit R. |
| | + | | | | + | | Signal IN. |
| | | + | | | + | | Signal FN. |
| | | | + | | + | | Signal γ. |
| | | | | + | + | | Signal M. |
| | | | | + | | + | Signal D. |
| | | | | | + | + | Signal C. |

In the specific system about to be described in detail, the address code of each mobile unit and of each fixed subscriber consists of an introductory character I giving rise to the start-of-message signal IM, a final character F giving rise to the end-of-message signal FM, and the call number proper having six digits (the first five of them significant) in the case of a mobile unit and nine digits (including the two-digit area code) in the case of a fixed subscriber; a sixth significant digit for a vehicle-borne unit may be accommodated upon a reversal of switch K. The last, i.e., sixth (or possibly seventh), digit of the call number of a mobile unit is either a "1" or a "0", depending on whether this number appears in an identification code emitted by the mobile unit itself or in the address selection of another party wishing to call that unit. The last (tenth) input lead $U_{11}$ on address card 172, assigned to a fixed subscriber, bears the designation *x* and serves to energize the lead $V_x$ terminating at NAND gate 71; if the preselected address had less than nine digits in its call number, e.g., if it were that of another mobile unit, one of its earlier inputs (e.g., conductor $U_8$) would form a junction with lead $V_x$ to trigger the end-of-selection signal Z.

In the present instance the mobile unit is assumed to have the address I-3-5-5-7-9-1/0-F whereas the call number on the preselected card 172 reads **0-2-7-7-9-5-5-5-8-*x*.** Thus, each of these numbers has at least one iterative digit.

If the coder DIS is called upon the programmer ER (FIGS. 4A and 4B) to read out the identification code stored in matrix MX′, i.e. upon the concurrent appearance of identification command ΔI and enabling signal $S_o$ together with a train of stepping pulses S, the electronic sequencer SE is activated with the advance of counter CT in response to the first stepping pulse to energize the outputs $\overline{P}_o$ in lieu of output $\overline{P}_1$. Signal ΔI conditions the six NAND gates 100 – 105 in the output of encoder CI for the selective passage of voltage to generate successive combinations of digital voltages A in the outputs of NAND gates 88 – 93. At the same time, input lead $M_I$ tied to output $\overline{P}_1$ is grounded in matrix MX′ to generate the initial character I by turning off the NAND gates 103 and 105 so as to energize the heretofore nonconducting NAND gates 91 and 93 (all the outputs of NAND gates 55 – 59 and 68 – 70 being energized at this stage) whereby, in the presence of on-hook signal $\overline{\Gamma}$, signals "1" and "R" are produced. This corresponds to the start-of-message signal IM in accordance with the foregoing Table.

In the second cycle of the counter, i.e., upon deenergization of output $\overline{P}_2$ in lieu of output $\overline{P}_1$, input lead $M_1$ of matrix MX' is grounded to turn off the NAND gates 102 and 103 with consequent conduction of NAND gates 90 and 91 to produce signals of numerical weights "2" and "1" corresponding to the first digit (3) in the call number of the mobile unit. In an analogous manner, the next digit (5) is generated in the third cycle by the grounding of output $\overline{P}_3$ and lead $M_2$ with consequent cutoff of NAND gates 101, 103 and conduction of NAND gates 89, 91.

In the fourth cycle, sequencer output $\overline{P}_4$ is grounded along with input lead $M_3$ of matrix MX' which, however, cuts off the gates 104 and 105 rather than the gates 101 and 103 as just described. Gates 92 and 93 now conduct to generate the repetition code R (sum of signals "O" and "R") denoting a recurrence of the immediately preceding digit (5).

In the fifth cycle, the grounding of output $P_5$ and input lead $M_4$ generates the fourth digit 7) in the call number of the mobile unit by concurrent energization of NAND gates 88 and 92 (outputs "7" and "0"). Similarly, the fifth and last significant digit (9) is generated in the sixth cycle by the de-energization of output $\overline{P}_6$ and lead $M_5$ with consequent conduction of NAND gates 88 and 90 (outputs "7" and "2").

In the seventh cycle, output $\overline{P}_7$ is grounded so that inverter 81 energizes one input each of NAND gates 86 and 87. If the receiver 174 (FIG. 2) is in place, i.e., if the readout of the identification code occurs in response to an incoming call (silent monitoring signal MS) of which the operator is not yet aware, the on-hook signal $\overline{G}$ blocks only the gate 86 so that inputs lead $M_6''$ is grounded to activate the NAND gates 88 and 89 (outputs "7" and "4") signifying the digit 0; if the operator of the mobile unit had initiated the call by lifting the receiver 174 off its hook to cancel the signal $\overline{G}$, NAND gate 87 would have been blocked to ground the lead $M_6'$ whereupon NAND gates 91 and 92 ("1" and "0") would have been activated to emit the digit 1.

Whereas in the case here assumed the cell number registered in encoder CI has only six digits, the existence of a seventh digit would have caused the blocking of gate 84 or 85 in the eighth cycle by the signal G or $\overline{G}$ to generate the discriminating digit 0 or 1. In the present instance the output $\overline{P}_9$ is grounded in that cycle and de-energizes input lead $M_F'$ to generate the end-of-message signal FM by the concurrent conduction of NAND gates 90 and 93. (With a larger number of digits in the identification code, this operation would occur in the ninth cycle.) Thereafter, counter CT grounds the output $\overline{P}_9$ and de-energizes the lead 178 to report the end of the readout of the identification code to the programmer ER; this results in the cancellation if signals $S_o$, S and ΔI with consequent resetting of counter CT and de-energization of output $\overline{P}_o$, thereby restoring the initial condition.

If signal ΔT appears in lieu of signal ΔI to command the readout of the selected address, counter CT is stepped as before and, by re-energizing sequencer output $\overline{P}_0$, unblocks the AND gate 53 whereby AND gate 66 also conducts inasmuch as NAND gate 51 has a true output. With sequencer output $\overline{P}_1$ grounded in the first cycle, NAND gate 68 cuts off so that AND gates 73 and 79 are blocked, with resulting activation of NAND gates 91 and 93 to generate the start-of-message signal IM. In the second cycle, output $\overline{P}_2$ is de-energized and grounds the first input lead $U_2$ of preselector PS whereby, via the junction provided on address card 172, output lead $V_0$ blocks the NAND gates 60 and 61 to activate gates 88 and 89 for generating the digit 0. In the third cycle, the grounding of output $\overline{P}_2$ ineffectually energizes one of the inputs of NAND gate 41 and grounds the output lead $V_2$ of card 172 to activate NAND gates 90 and 92 for generating the second digit (2) of the called number.

In the fourth cycle, similarly, one input of NAND gate 42 is ineffectually energized by the grounding of sequencer output $\overline{P}_4$ which de-energizes the lead $V_7$ and unblocks the NAND gates 88 and 92 to yield the third digit (7).

In he fifth cycle, the output $\overline{P}_5$ is grounded and energizes, via inverter 15, one input of NAND gate 43 whose other input is connected by way of inverter 34 to the output lead $U_4$ of inverter 24 tied to the conductor $V_7$; since this conductor is grounded by the output lead $U_5$ of inverter 25, which also forms a junction with conductor $V_7$, NAND gate 43 is cut off and causes the NAND gate 50 to have a true output with resulting blocking of NAND gate 51. This operation removes voltage from the output of AND gate 66 so that NAND gates 60–64 cannot be turned off. At the same time, through inverter 52, flip-flop FF is switched and NAND gate 70 is blocked to cut off the two AND gates 73 and 78 whereby the repetition code R appears in the outputs of NAND gates 92 and 93.

Upon the occurrence of the next stepping pulse S, flip-flop FF is tripped so that its output Q disappears and restores the true output of NAND gate 51 regardless of the condition of NAND gate 50. This permits the readout of the next digit (9) in the sixth cycle upon the grounding of output $P_6$ and leads $U_6$, $V_9$ with resulting conduction of NAND gates 88 and 90. With lead $V_7$ no longer grounded, all the NAND gates in the input of gate 50 again conduct so that this gate has no output.

In the seventh cycle the sixth digit (5) is read out by the de-energization of output $\overline{P}_7$ and leads $U_7$, $V_5$ with conduction of gates 89 and 91.

In the eighth cycle, by a process analogous to that described for the iterative third and fourth digits (7), the readout of the second occurrence of digit 5 is blocked by the cutoff of NAND gate 46 and the consequent conduction of NAND gate 50 with closure of NAND gate 51. Flip-flop FF, which had been reset to its normal condition by the sixth stepping pulse S, is again reversed by the ninth stepping pulse so as to make the gate 51 unswitchable in its conductive state. Thus, the eight digit (5) is read out during that cycle in the normal manner, like the seventh digit. An analogous readout in the tenth cycle yields the last digit (8) by the grounding of output $\overline{P}_{10}$ and leads $U_{10}$, $V_8$ with resulting conduction of NAND gates 88 and 91. Finally, in the eleventh cycle, lead $V_x$ is grounded to unblock the NAND gate 71 with resulting cutoff of NAND gate 69 along with AND gates 73 and 80, thereby activating the NAND gates 90 and 93 to generate the end-of-message signal FM. Immediately thereafter, in the twelfth and last cycle of the counter, the grounding of output $\overline{P}_{12}$ prevents a cutoff of NAND gate 71 upon the reenergization of lead $V_x$ and maintains the suppression of signal Z in the output of NAND gate 72. In response to the end-of-selection signal Z, programmer ER restores the sequencer SE to normal as described above and more fully discussed hereinafter.

It will be noted that the two sets of inverters 12 – 21 and 22 – 31, aside from their normal function, also serve to confine the short-circuiting effect of conductors $V_5$ and $V_7$ on card 172 to corresponding output leads U without affecting the outputs $\overline{P}_2 - \overline{P}_{11}$ of matrix MX.

The aforedescribed readout operation has been illustrated diagrammatically in FIG. 5 which shows the stepping pulses S as well as the outputs $\overline{P}_o - \overline{P}_{11}$ of sequencer SE, the outputs of NAND gates 50 and 51 and the output Q of flip-flop FF.

FIGS. 4A and 4B show details of the programmer ER which is subdivided into a permanently energized part *er'* and a normally de-energized part *er''*. Part *er'* includes three bistable multivibrators or binary memories B1, B5 and B11 whose cross-connected stages are designed as NAND gates; such a multivibrator has the property that in each of its two operating states only one NAND gate, i.e., the one with a true input, is switchable.

Memory B1 responds to the off-hook signal G which is also fed, together with the negated inhibition signal $\overline{Y}$, to a NAND gate 111 in the setting input of memory B5, this input also receiving the output of another NAND gate 110 having inputs energizable by signals $\overline{G}$ and MA. An inverter 112, connected in the output of a NAND gate 113 in programmer section *er''*, normally has a true output (due to the deactivation of that section) feeding the resetting inputs of memories B1 and B5 as well as the NAND gates 110 and 111. The set output of memory B5 is delivered in parallel to a switching circuit IT, which normally deactivates a 12V power supply 179 for programmer section *er''*, and to a delay network CAR feeding a bus bar 180 which extends to the setting input of memory B11 as well as to an input of an AND gate 131 whose other input is tied to the set output of that memory. AND gate 131, when energized, delivers the engagement signal L which also conditions a multiplicity of AND gates 139 – 143 for reception of output voltages from respective stages of a ring counter CA giving rise to the scanning or turning signals collectively designated W.

Programmer section *er''* includes eight multivibrators or binary memories B2 – B4, B6 – B10 of the aforedescribed bistable type, each of these multivibrators having a resetting input connected to bus bar 180; the delay of network CAR in the energization of that bus bar allows these multivibrators to assume, upon the activation of power supply 179, an initial state in which the stage connected to bus bar 180 is unswitchable by having zero voltage applied to one of its inputs from the output of its companion stage which also has a normally energizing setting input. Thus, memories B2 and B6 are fed with the signal $\overline{D}$ from an inverter 107 in the output of a signal decoder DSS receiving the switching signals $df_5$, $df_6$, $df_7$ from decoder PS (FIG. 2), this decoder including a further output inverter 106 as well as a NAND gate 108 (with an input normally energized by signal $\overline{G}$) respectively delivering the signal $\overline{C}$ to a NAND gate 113 and the signal $\overline{H}$ to a setting input of multivibrator B3; the input leads of gates 106 – 108 include inverters 136 – 138 connected to generate the signals H, D and C from the combinations of switching signals listed in the foregoing Table. Memory B7 is switchable by the output of a NAND gate 139 with inputs from multivibrators B2, B3, B10 and from the leads carrying the signals TS and G. Memory B8 responds to the output of multivibrator B2 which also feeds an AND gate 125 for the stepping of ring counter CA. On-hook signal $\overline{G}$ controls the memory B9 as well as a NAND gate 135 also receiving the reset output of multivibrator B6 and the set output of multivibrator B10, its own output being the signal $\overline{\Gamma}$. Memories B6 and B7 work into respective inverters 134 and 128 to generate the identification and selection commands ΔI and ΔT. The enabling signal $S_o$ for the counter CT of FIG. 3A is derived from the output of a NAND gate 127 controlled by memories B6 and B7, this output being also delivered to a NAND gate 129 together with that of a clock circuit GT generating the stepping pulses S.

A delay counter CR, adapted to be stepped by the pulses of clock circuit GT, has several preferably adjustable outputs working into various NAND gates 118, 120 and 124. Counter CR is enabled in the absence of carrier signal PPP, via a pair of cascaded NAND gates 116 and 117, to measure the duration of any failure of short-wave transmission from the central office to the mobile unit. One of the inputs of NAND gates 117 is energized by the output of a NAND gate 133 receiving the signal $\overline{G}$ as well as the set output of multivibrator B9. This signal $\overline{G}$, derived from signal G via an inverter 121, is also delivered to a NAND gate 123 together with the signal RO generated by multivibrator B11 in the event of a busy condition. NAND gate 123 energizes the AND gate 113 which also receives the outputs of NAND gates 118 and 120; NAND gate 124 controls the generation of busy signal RO by multivibrator B11.

We shall now describe the operation of programmer ER upon the initiation of both incoming and outgoing calls.

The transceiver 171 of FIG. 2, on picking up a monitoring signal MS which includes the identification code of this particular mobile unit, emits the alert signal MA which blocks the NAND gate 110 in the presence of on-hook signal $\overline{G}$ inasmuch as the third input of this NAND gate is energized at this stage from the output of inverter 112 whose input voltage is zero. This switches the multivibrator B5 which thereupon cuts in the power supply 179, and, after a short delay in network CAR, energizes the bus bar 180. At this point, the lower outputs of all the multivibrators of programmer section *er''* except circuits B9 and B10 are energized, these multivibrators being therefore switchable by a grounding of their upper inputs.

With the upper output of memory B11 conducting, AND gate 131 is open to pass the engagement signal L. With three of the inputs of AND gate 125 continuously energized, the timing pulses arriving at its fourth input from clock circuit GT traverse this gate and step the ring counter CA to activate successive outputs W for changing the tuning of transceiver 171 (FIG. 2). This ring counter has no home position so that it may start its scanning cycle on any one of its several (here five) outputs; this random exploration of a plurality of radio channels by the various mobile units in the area improves the chance of early discovery of a free channel by any of these units.

As soon as such a free channel has been found, decoder DSS generates the availability signal D in the output of inverter 107 to switch the bistable circuits B2 and B6, with consequent blocking of the passage of clock pulses to AND gate 125 and with a flipping of multivibrator B8 to generate the transmission command T in lieu of its negation $\overline{T}$. Circuit B6, via inverter 134, generates the identification command ΔI which causes a readout of the identification code stored in matrix MX' of encoder CI (FIG. 3B) as described above. Multivibrator B10 is flipped at the same time to energize its lower output leading to NAND gate 135. NAND gate 127 conducts to deliver the enabling signal $S_o$ to counter CT and to unblock the NAND gate 129 for the passage of stepping pulses S to that counter from clock circuit GT.

At the end of the readout of the identification message, lead 178 is grounded by the absence of output $\overline{P}_9$ (or $\overline{P}_{10}$) and resets the bistable circuit B6 with consequent cancellation of identification command ΔI as well as enabling signal $S_o$ and with discontinuance of the transmission of stepping pulses S. At this point, the three inputs of NAND gate 135 are all energized since, presumably, the operator at the mobile unit has not lifted his handset 174 (FIG. 2) off the hook 175 so that signal $\overline{G}$ is still on. This condition terminates the transmission of signal Γ and replaces it by the signal $\overline{\Gamma}$ which is now transmitted to the central station by the combination of tones $f_4$ and $f_6$ (see the foregoing Table) to elicit the generation of the ringing signal H synthesized from signal voltages $\overline{df_5} + \overline{df_6} + \overline{df_7}$ in the input of NAND gate 108. The ringing circuit is stopped by the disappearance of signal $\overline{G}$ as the user picks up his receiver to answer the call. This action restores the signal Γ in the output of NAND gate 135 whereupon conversation between the two interconnected stations is allowed to take place.

The voice frequencies used for this conversation may be modulated upon carrier frequencies (within the band allocated to the engaged channel) identical with or different from the aforementioned carriers $cw_I$ and $cw_{II}$; the incoming carrier frequency is sensed in transceiver 171 by a detector generating the signal PRS in its presence. When carrier reception at the mobile station is normal, therefore, the lowest input of NAND gate 116 is de-energized so that NAND gate 117 is cut off as long as both NAND gates 130 and 133 conduct. Since, however, NAND gate 130 is initially cut off until the output of multivibrator B8 switches from $\overline{T}$ to T, delay counter DR is stepped by the clock pulses from timer GT while the ring counter CA hunts for a free channel. If this search is unsuccessful over a full cycle of the ring counter, delay counter DR reaches a position in which three of its stages energize corresponding inputs of NAND gate 124 whose fourth input is already under voltage from the output of NAND gate 130 by way of an inverter 122. NAND gate 124 thereupon trips the multivibrator B11 whose lower output generates the busy signal RO with the effect of blocking the NAND gate 123 also receiving the on-hook signal $\overline{G}$. This grounds one of the four inputs of NAND gate 113 (whose other three inputs are still energized from gates 106, 118 and 120, respectively) so that inverter 112 cuts off the supply to the lower inputs of memories B1 and B5 as well as NAND gates 110 and 111. The resulting reversal of multivibrator B5 de-energizes the bus bar 180 and deactivates the power supply 179 to restore the original quiescent condition of the programmer.

In an analogous manner, a fading of the carrier with resultant reappearance of signal $\overline{PFR}$ in the input of NAND gate 116 after establishment of telecommunication restarts the delay counter CR which is reset any time the output of NAND gate 117 is cut off. If, under these conditions, counter CR reaches a position in which NAND gate 118 is blocked, NAND gate 113 starts conducting and reverses the multivibrator B5 as just described. The same release of the programmer occurs upon termination of the conversation by either of the interconnected parties. If the user of the mobile unit hangs up first, after a switching of multivibrator B9 by off-hook signal G, the reappearance of the negation $\overline{G}$ of this signal blocks the output from NAND gate 133 whereupon NAND gate 117 restarts the delay counter CR which (unless signal G promptly returns) reaches a position wherein NAND gate 120 is cut off by the coincidence of voltages from the counter and from an inverter 119 in the output of gate 133. If, on the other hand, the remote subscriber disconnects first, the release signal C appearing in the output of inverter 106 (generated by the combination of switching signal $\overline{df_5} + df_6 + df_7$) directly activates the NAND gate 113 to de-energize the programmer section *er''*. In each of these cases, ring counter CA remains in the position last reached.

Let us now consider the case where the occupant of the vehicle initiates a call by lifting the receiver 174, thereby feeding the signal G to the sole heretofore de-energized input of NAND gate 111. Memory B5 is again switched by this procedure and, after the short delay introduced by network CAR, activates the programmer section *er''* as previously described. If an available channel is found before the delay counter CR has run its course, i.e., before the NAND gate 124 is blocked to reverse the multivibrator B11, reappearance of availability signal D (generated by the combination of switching voltages $df_5 + \overline{df_6} + df_7$ in the input of inverter 107) again switches the memories $B_2$, $B_6$, $B_8$ and $B_{10}$ to halt the scan and to start the transmission of the identification code. Upon proper registration of this identification code at the central office, the operator receives a dial tone or equivalent (e.g., luminous) signal authorizing him to depress the pushbutton 173 (FIG. 2) for initiating the selection of the called number by the generation of start signal TS. The dial tone may be transmitted from the central office as a combination of, say, tone $f_7$ with one of the tones $f_1 - f_4$. The absence of ringing signal H prevents the reversal of multivibrator B3. With four of the five inputs of NAND gate 139 now energized, signal TS applies voltage to the fifth input so as to cut off the output of that NAND gate whereby multivibrator B7 is switched to generate the selection command ΔT by way of inverter 128. NAND gate 127 then becomes conductive to pass the stepping pulses S and the enabling signal $S_o$ to the counter CT of FIG. 3A. Upon completion of the readout of the selected call number, the cancellation of signal $\overline{Z}$ in the input of multivibrator B4 switches the latter so that, upon the subsequent recurrence of signal $\overline{Z}$, NAND gate 114 is blocked to reset the multivibrator B7 and terminate the emission of selection command ΔT, enabling signal $S_o$ and stepping pulses S. At this point, contrary to the situation previously described, the absence of signal $\overline{G}$ in the input of NAND gate 135 maintains the signal $\overline{\Gamma}$ to indicate the off-hook condition at the mobile unit.

If the search for an idle channel had been unsuccessful, the appearance of busy signal RO in the output of multivibrator B11 would have lit a lamp on panel KP (FIG. 2) or operated equivalent indicator means under the control of hook switch 175.

Naturally, hook switch 175 can also be replaced by some other manually operable switch, e.g., where the micro-telephone 174 is fixedly mounted in the vehicle instead of constituting a movable handset.

FIG. 6 shows details of the control circuit CG (see also FIG. 2) which supplies the selection signals FB and FC to the modulators GB and GC, respectively. This circuit includes ten logical gates 181 – 190 divided into two groups, i.e., a group of 182, 184, 186, 188, 190 for generating the signals $\overline{FB}$ and a group 181, 183, 185, 187, 189 for generating the signals $\overline{FC}$. These two groups are connected in respective preference circuits to six leads 191 – 196 carrying signals $A_o$, $A_1$, $A_2$, $A_4$, $A_7$ and $A_R$ which emanate from the outputs of NAND gates 92, 91, 90, 89, 88 and 93, respectively, shown in FIG. 3B. The first group gives precedence to the lower numerical ranks or weights (the weight "R" being considered the highest), the first gate 182 in the group being a simple inverter whereas the others are NAND gates 184, 186, 188, 190 with a progressively increasing number of inputs connected to the outputs of the preceding gates whereby the activation (i.e., cutoff) of any lower-order gate locks out (i.e., maintains conductive) all the higher-order gates of the group. In an analogous manner, the second group includes an inverter 181 and four NAND gates 183, 185, 187, 189 with a progressively increasing number of inputs connected in similar lockout paths. Conductors 191 – 195 are connected in that order to the gates 182 – 190 of the first group whereas conductors 192 – 196 are connected in the reverse order to gates 181 – 189 of the second group. The five outputs of the first group of gates, collectively designated $\overline{FB}$, have been labeled $\overline{FB}_o$, $\overline{FB}_1$, $\overline{FB}_2$, $\overline{FB}_4$ and $\overline{FB}_7$ in conformity with the respective numerical weights represented thereby; in like manner, the outputs FC of the second group of gates have been individually designated $\overline{FC}_R$, $\overline{FC}_7$, $\overline{FC}_4$, $\overline{FC}_2$ and $\overline{FC}_1$. It will thus be seen that the simultaneous energization of any two leads 191 – 196 grounds a single output of the first group of gates and a single output of the second group of gates, with transfer of the lower-weight signal to group $\overline{B}$ and of the higher-weight signal to group $\overline{FC}$. Thus, modulator GB of FIG. 2 invariably operates on a lower-ranking signal frequency than modulator GC although, of course, this rank does not necessarily correspond to the relative magnitude of the frequencies involved.

FIG. 7 shows the principal components of the central office or exchange communicating with the mobile unit described above. In addition to the transceiver 302 and the terminal equipment 305 already referred to, this central office includes a number of processing units $PU_1$ – $PU_n$ co-operating therewith. Processer $PU_1$, shown in detail, is representative of all these units and comprises a group of six frequency detectors $FD_1$ – $FD_6$ (i.e., combinations of band-pass filters and rectifiers) which receive the demodulated audio output of transceiver 302 to derive respective signals $F_1$ – $F_6$ together with their negations $F_1$ – $\overline{F}_6$ from the presence or absence of audio frequencies $f_1$ –$f_6$. These signals are sent to a code converter CC which includes a buffer register 321 and a main register 322 for the temporary storage thereof. Buffer register 321 may comprise a plurality of flip-flops respectively settable by signals $F_1$ – $F_6$ and resettable by their inversions $F_1$ – $\overline{F}_6$, the switching of any flip-flop giving rise to a "new digit" signal CP sent to terminal equipment 305 for eliciting from it a readout pulse PC which transfers the contents of register 322 to the assigned register in the common terminal and which ceases as soon as this registration is completed. Upon simultaneous presence of signals $F_1$ and $F_6$ in buffer register 321, representing the repetition code "R," this code is not transferred to register 321 but, instead, the contents of the latter register are preserved during the next readout pulse PC whereby the same digit is iteratively fed to the register of equipment 305. signals $DC_o$, $DC_1$, $DC_2$, $DC_4$ and $DC_7$ represent the numerical weights transferred to equipment 305 in the registration of any digit. Code converter CC further generates an error signal E in response to, say, the simultaneous presence of less or more than two input signals $F_1$ – $F_6$.

During the storage of a numerical message, i.e., upon reception of any legitimate signal combination, converter CC emits a signal MC; start-of-message signal IM and end-of-message signal FM, synthesized in the manner described with reference to the foregoing Table, are also generated along with the hook signal Γ. The latter signal is delivered only to a programmer PG which also receives the signals E, MC and IM in parallel with equipment 305. The programmer is furthermore directly connected to transceiver 302 for receiving therefrom a "carrier present" signal PR as well as a trouble signal AL denoting improer functioning. From the common terminal equipment 305 the programmer PG receives an alert signal *ch*, a ringing signal CH, a dial-tone signal SC, a disconnect signal DC and an availability signal AD; in turn, it transmits to equipment 305 a response signal GA and a busy signal OS. Other programmer outputs carry signals $TF_5$, $TF_6$ and $TF_7$ or enabling the transmission of combinations of signal frequencies $f_5$, $f_6$ and $f_7$ from the terminal to a pair of modulators (not shown) in the transceiver 302 by way of a switching circuit $IT_o$.

FIG. 8 shows details of programmer PG of unit $PU_1$. This programmer comprises five component circuits $\alpha_1$ – $\alpha_5$, the first three of these circuits including respective multivibrators $\beta_1$ – $\beta_3$ which are the functional equivalents of the binary memories $B_1$ – $B_{11}$ shown in FIGS. 4A and 4B although differing therefrom by the use of NOR gates instead of NAND gates. Circuits $\alpha_2$, $\alpha_3$ and $\alpha_4$ further include respective monoflops $MF_1$ with an off-period of 45 seconds, $MF_2$ with an off-period of 300 ms and $MF_3$ with an off-period of 7 seconds; all these monoflops normally have a true output. Circuit $\alpha_5$ is of the bistable type and is inserted between a NAND gate 204 and an inverter 212 whose output is delivered to another NAND gate 223 and in parallel therewith to one of six inputs of a NAND gate 218 controlling the monoflop $MF_3$. Five other inputs of NAND gate 218 receive the inverted error signal $\overline{E}$, the inverted disconnect signal DC, the output of a NAND gate 215 in circuit $\alpha_2$, the output of a similar NAND gate 217 in circuit $\alpha_3$ and the output of a further NAND gate 205 connected to receive the signals $\overline{ch}$ and Γ.

Monoflop $MF_3$ works into two NAND gates 220, 221 whose outputs are control voltages $TF_6$ and $TF_7$ for signal frequencies $f_6$ and $f_7$, respectively; it also normally energizes another input of NAND gate 223, whose output is the inverted busy signal $\overline{OS}$, as well as one input of NAND gate 204 whose other input receives the carrier signal PR. The same carrier signal is fed to one of four inputs of an AND gate 213 in circuit $\alpha_1$ whose other three inputs are connected to the lower output of multivibrator $\beta_1$, the output of an inverter 207 receiving the hook signal $\overline{\Gamma}$, and a lead carrying the call signal CH. Through an inverter 202 the call signal is fed to an input of NAND gate 220 in parallel with an input of another NAND gate 219 which generates the control voltage $PF_5$ for signal frequency $f_5$. Inverter 202 also energizes an input of a NAND gate 203 receiving on its other input the inverted dial-tone signal $\overline{SC}$. The output of AND gate 213, representing the response signal GA, is fed via an AND gate 211 to the upper input of multivibrator $\beta_2$ in circuit $\alpha_2$ which further receives the output of NAND gate 203 supplied in parallel therewith to NAND gate 215 and to a further AND gate 210.

Signal IM is fed to AND gate 210 as well to the lower input of multivibrator $\beta_3$. A further NAND gate 214 has five inputs connected to receive the inverted trouble signal $\overline{AL}$, the availability signal AD, the output of bistable circuit $\alpha_5$ which is also fed to the lower input of multivibrator $\beta_2$, and the outputs of monoflops MF1 and MF3; this NAND gate produces a zero output whenever the associated channel is free, this output going to NAND gates 219 and 221 as well as to an input of NAND gate 217 in circuit $\alpha_3$ whose multivibrator $\beta_3$ receives the same output by way of an inverter 216. Signal $\overline{ch}$ is also supplied to the lower input of multivibrator $\beta_1$ and through an inverter 206 to an input of an AND gate 208 also receiving the hook signal Γ; this AND gate controls the upper input of multivibrator $\beta_1$.

In the presence of a carrier signal PR, which cuts off the NAND gate 204, bistable circuit $\alpha_5$ is instantly set to generate the same zero voltage in its output; on the other hand, the disappearance of signal PR resets the circuit $\alpha_5$ only after 5 seconds, this delay being due to a relatively large time constant in the resetting input of that circuit as compared with its setting input. (For the sake of simplicity, only a single input connected to the output of NAND gate 204 has been shown.)

Normally, the active outputs of multivibrators $\beta_2$ and $\beta_3$ conduct whereas that of multivibrator $\beta_1$ does not. With all the five inputs of NAND gate 214 energized, signals $TF_5$ and $TF_7$ come into existence by the unblocking of NAND gates 219 and 221 each having only one input energized at this time.

Let us consider, again, the case of a call initiated by a fixed subscriber station or another mobile unit trying to contact, by way of the exchange shown in FIGS. 7 and 8, the unit previously described. Upon the alerting of that mobile unit by the monitoring signal MS (FIG. 1), with simultaneous disappearance of the negated signal $\overline{ch}$, the transceiver 171 thereof scans the existing radio channels and seizes (it is assumed) the channel associated with the precessor $PU_1$. This results in the reception of carrier wave over the channel at the central office with generation of signal PR so that NAND gate 204 is blocked (monoflop $MF_3$ having a true output) and, via bistable circuit $\alpha_5$, instantly activates the NAND gate 214 to terminate the availability signal D (combination of tones $f_5$ and $f_7$). The output of NAND gate 214 is also applied to monoflop $MF_2$ and, in parallel therewith by way of inverter 261, to memory $\beta_3$ which thereby becomes switchable upon the arrival start and of message signal IM. If the signal is not received within the off-normal time of 300 ms measured by the monoflop $MF_2$, the return of this monoflop to normal switches the NAND gate 217 in circuit $\alpha_3$ to de-energize one of the inputs of NAND gate 218 in circuit $\alpha_4$ with consequent tripping of monoflop $MF_3$.

This monoflop, on going off normal, generates the release signal C (cf. FIG. 4A) by the concurrent unblocking of NAND gates 220 and 221.

Normally, the signal IM should be received within a period on the order of 100 ms after the termination of the availability signal. In this case all inputs of NAND gate 218 remain energized so that the release circuit $\alpha_4$ is not triggered, provided of course that neither an error signal E nor a local disconnect signal DC is received from the terminal equipment 305.

After the mobile unit has transmitted its identification code, it sends out the signal Γ (as described above) to indicate the on-hook condition of its receiver. The concurrent energization of AND gate 208 by signals α and *ch* (the latter appearing in the output of inverter 206) switches the memory $\beta_1$ so as to energize one of the inputs of AND gate 213 which also has another one of its inputs energized at this time by the signal PR. After the terminal equipment 305 has matched the identification code of the memory unit with the address code received from the calling station and has linked that station with the seized radio channel, the ringing signal CH is generated and energizes a further input of AND gate 213 while also enabling NAND gates 219 and 220 to generate the signal H while also enabling NAND gates 219 and 220 to generate the signal H for transmission to the mobile unit. This action unblocks the NAND gate 203 whereby a timing signal is transmitted to circuit $\alpha_2$, i.e., to the input of monoflop $MF_1$ thereof in parallel with the input of NAND gate 215. The same signal appears in respective inputs of AND gates 210 and 211 working into the upper input of memory $\beta_2$.

If the operator of the mobile unit picks up his receiver within the time of 45 seconds measured by monoflop $MF_1$, AND gate 213 conducts and emits the response signal GA, at the same time driving the AND gate 211 into conduction so that memory $\beta_2$ is switched and NAND gate 215 remains conductive to prevent actuation of release circuit $\alpha_4$. Again, the absence of a timely response from the mobile unit will de-energize one of the inputs of NAND gate 218 to trip the monoflop $MF_3$ and to generate the release signal C.

The transmission of response signal Ga to the terminal equipment cancels the alert signal *ch* so that NAND gate 205 has one of its inputs energized and conducts upon the reappearance of hook signal Γ as a sign that the mobile user has restored his receiver. Thus, unless the locally generated disconnect signal DC occurs first in response to the termination of the conversation by calling party, monoflop $MF_3$ is tripped by the disappearance of the output of NAND gate 205.

If the call is initiated by the operator of the mobile unit, the readout of the identification code of that unit proceeds as before; since that code has the characteristic final digit "1" in its call number, the terminal equipment 305 recognizes it as that of a vehicular station and generates the dial-tone signal SC whereby, as before, NAND gate 203 conducts and starts the timing sequence of circuit $\alpha_2$. The concurrent transmission of the dial-tone frequency combination to the mobile unit normally induces the operator to select the call number of the desired party; the start of this selection is again marked by the appearance of signal IM which, as before, reverses the memory $\beta_2$ to prevent the blocking of NAND gate 215 and the resulting activation of release circuit $\alpha_4$. The termination of the conversation, under the control of either party, takes place in the same manner as in the previous case.

If at any time during telecommunication the carrier received by the central office over the engaged channel fails, the disappearance of signal PR starts the delay time (5 seconds) of bistable circuit $\alpha_5$ running so that, if carrier reception is not resumed within that period, inverter 212 de-energizes the associated input of NAND gate 218 to release the channel.

As long as inverter 212 has a true output and monoflop $MF_3$ is not tripped, NAND gate 223 is blocked to transmit the busy signals OS to the terminal equipment 305.

If at any time the trouble signal AL should be received by the programmer PG, the de-energization of one of the inputs at NAND gate 214 by the disappearance of the inverted signal $\overline{AL}$ renders this NAND gate conductive so as to cancel the availability signal controlled by the outputs of NAND gates 219 and 221.

We claim:

1. A method of transmitting multidigit numbers over a radio channel between two communicating stations, comprising the steps of successively converting each digit of a number to be transmitted into a characteristic combination of signal frequencies, ascertaining the presence of iterative digits in said number, and converting every other one of a succession of such iterative digits into an invariable frequency combination unrelated to the numerical value of said iterative digits.

* * * * *